UNITED STATES PATENT OFFICE 2,649,451

COPPER 7-BENZYL-8-QUINOLINATE

William B. Wheatley, Syracuse, N. Y., assignor to Bristol Laboratories Inc., Syracuse, N. Y., a corporation of New York No Drawing. Application May 24, 1952, Serial No. 289,869

2 Claims. (Cl. 260—270)

This invention relates to a new compound of value as an anti-fungal agent and more particularly to copper 7-benzyl-8-quinolinate.

The compound of the present invention may be represented by the following general formula:

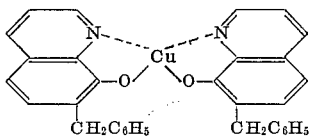

The compound of the present invention is of low toxicity and is useful as an anti-fungal agent, particularly to prevent mildew in cloth.

The following example will serve to illustrate the invention.

EXAMPLE I

A. 7-benzyl-8-hydroxyquinoline

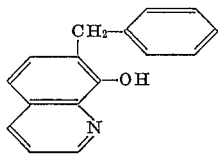

A solution of 100 grams (0.69 mole) of 8-hydroxyquinoline in 250 ml. of toluene is added slowly to a stirred suspension of 16.5 grams (0.69 mole) of sodium hydride in 750 ml. of toluene. The reaction mixture is refluxed for thirty minutes, and then 78 grams (0.69 mole) of benzyl chloride is added dropwise over a period of five hours. After refluxing overnight, the reaction mixture is hydrolysed with dilute hydrochloric acid. Sodium bicarbonate is added until the pH rises to 8. The toluene layer is then removed and the solvent stripped under reduced pressure. The residue is taken up in 400 ml. of Claisen's alkali and extracted twice with Skellysolve D. Careful adjustment of the pH of the aqueous layer to 7 with hydrochloric acid causes a semisolid material to separate, which is extracted with ether containing a little chloroform. The extracts are combined, dried, and stripped. Distillation of the residue gives 93 grams (58% yield) of 7-benzyl-8-hydroxyquinoline, B. P. 193°–205°/3 mm. The product melts at 96.5–97.5° after recrystallization from cyclohexane.

Anal.: Calcd. for $C_{16}H_{13}ON$:

|   | Calculated | Found |
|---|---|---|
| C | 81.7 | 81.7 |
| H | 5.6 | 5.6 |

B. Copper 7-benzyl-8-hydroxyquinolate 7-benzyl-8-hydroxyquinoline (14.1 grams) is dissolved in 250 ml. of refluxing methanol. There is then added over a period of five minutes a solution of cupric acetate monohydrate (6.0 grams) in 100 ml. of methanol and 10 ml. water. The reaction mixture is stirred under reflux for thirty minutes. The precipitate of copper 7-benzyl-8-hydroxyquinolate is collected by filtration from the hot reaction mixture, washed twice with hot methanol, and found to melt at about 245°–248°. A sample was recrystallized three times from dimethylformamide and melted at 252°–253° C. (corrected).

Anal. Calcd. for $C_{32}H_{24}N_2O_2Cu$:

|   | Calculated | Found |
|---|---|---|
| C | 72.23 | 72.4 |
| H | 4.55 | 5.07 |
| CuO | 15.0 | 12.0 |

For the purpose of inhibiting the growth of fungi, the treating agent may be applied to humans and other animals, and to plants, fabrics and organic materials in general. Application may be directly by means of a solution of the agent or a liquid carrier therefor, or the agent may be in powder or other solid form. Spraying is an effective method of application.

I claim:
1. Copper 7-benzyl-8-quinolinate.
2. The process of reacting 7-benzyl-8-hydroxyquinoline with a soluble cupric salt and isolating therefrom copper 7-benzyl-8-hydroxyquinolinate.

WILLIAM B. WHEATLEY.

References Cited in the file of this patent

UNITED STATES PATENTS

| Number | Name | Date |
|---|---|---|
| 2,372,588 | Larsen et al. | Mar. 27, 1945 |
| 2,381,863 | Benignus | Aug. 14, 1945 |

OTHER REFERENCES

Wheatley et al., J. Am. Chem. Soc. 71, 1949, pp. 3795–97.